United States Patent
Shindou

(10) Patent No.: US 10,338,570 B2
(45) Date of Patent: Jul. 2, 2019

(54) NUMERICAL CONTROLLER

(71) Applicant: FANUC CORPORATION, Minamitsuru-gun, Yamanashi (JP)

(72) Inventor: Masaaki Shindou, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 48 days.

(21) Appl. No.: 15/592,361

(22) Filed: May 11, 2017

(65) Prior Publication Data

US 2017/0329305 A1 Nov. 16, 2017

(30) Foreign Application Priority Data

May 12, 2016 (JP) ................................. 2016-096262

(51) Int. Cl.
*G05B 19/4155* (2006.01)
*G05B 19/408* (2006.01)
(Continued)

(52) U.S. Cl.
CPC ......... *G05B 19/4155* (2013.01); *B23Q 15/22* (2013.01); *G05B 19/408* (2013.01);
(Continued)

(58) Field of Classification Search
CPC .............. G05B 19/4062; G05B 19/408; G05B 19/4155; G05B 2219/35262;
(Continued)

(56) References Cited

U.S. PATENT DOCUMENTS 3,798,427 A * 3/1974 Conners ............... G05B 19/416
318/371
4,370,720 A * 1/1983 Hyatt .................. B60R 16/0373
700/194
(Continued)

FOREIGN PATENT DOCUMENTS

EP 2009530 A2 * 12/2008 ......... G05B 19/4155
JP H05210408 A 8/1993
(Continued)

OTHER PUBLICATIONS

Notification of Reasons for Refusal for Japanese Application No. 2016-096262, dated May 29, 2018, with translation, 8 pages.

*Primary Examiner* — Crystal J Barnes-Bullock
(74) *Attorney, Agent, or Firm* — RatnerPrestia

(57) ABSTRACT

A numerical controller capable of finely designating a restart condition for look-ahead for a program after suppression of the look-ahead is configured to sequentially read out and analyze commands for blocks of a program, perform look-ahead processing to save the result of the analysis in a buffer, and execute the commands for the blocks looked ahead based on the analysis result saved in the buffer, thereby controlling a machine, and is provided with a function of stopping the look-ahead processing when a block into which a code for stopping look-ahead is inserted is read out from the program. The numerical controller is characterized by being provided with a restart condition determination unit, configured to determine whether or not a look-ahead restart condition commanded by the code for stopping look-ahead (Continued)

is satisfied, and a look-ahead preceding restart unit, configured to restart the look-ahead processing if it is determined by the restart condition determination unit that the restart condition is satisfied, and in that the restart condition is a condition related to the state of the machine.

2 Claims, 7 Drawing Sheets

(51) Int. Cl.
    *G05B 19/4062* (2006.01)
    *B23Q 15/22* (2006.01)
    *G05B 19/4063* (2006.01)

(52) U.S. Cl.
    CPC ..... *G05B 19/4062* (2013.01); *G05B 19/4063* (2013.01); *G05B 2219/34013* (2013.01); *G05B 2219/34015* (2013.01); *G05B 2219/35262* (2013.01); *G05B 2219/35386* (2013.01); *G05B 2219/43162* (2013.01)

(58) Field of Classification Search
    CPC ........... G05B 2219/35386; G05B 2219/43162; B23Q 15/22
    See application file for complete search history.

(56) References Cited

U.S. PATENT DOCUMENTS

| | | | | |
|---|---|---|---|---|
| 4,807,501 | A * | 2/1989 | Leigh | B23B 3/06 451/19 |
| 5,025,385 | A * | 6/1991 | Froyd | G05B 19/41 700/169 |
| 6,386,008 | B1 * | 5/2002 | Virtanen | B21D 5/02 72/19.8 |
| 7,792,604 | B2 * | 9/2010 | Hong | G05B 19/41 700/187 |
| 10,010,975 | B2 * | 7/2018 | Oka | B23K 26/08 |
| 2007/0278980 | A1 | 12/2007 | Wilson | |
| 2008/0294877 | A1 | 11/2008 | Haga et al. | |
| 2014/0088755 | A1 | 3/2014 | Haga et al. | |
| 2016/0282846 | A1 * | 9/2016 | Nagaoka | B23Q 15/22 |
| 2017/0308059 | A1 * | 10/2017 | Ono | G05B 19/4093 |

FOREIGN PATENT DOCUMENTS

| | | | | |
|---|---|---|---|---|
| JP | H11300577 | A | 11/1999 | |
| JP | 2003058217 | A | 2/2003 | |
| JP | 2008-040542 | | 2/2008 | |
| JP | 2008293261 | A * | 12/2008 | ......... G05B 19/4155 |
| JP | 4271248 | | 6/2009 | |
| JP | 2014048761 | A * | 3/2014 | ......... G05B 19/4155 |
| JP | 2014063389 | A | 4/2014 | |
| JP | 2016051249 | A | 4/2016 | |

* cited by examiner

FIG. 3

| RESTART CONDITION | DESCRIPTION EXAMPLES OF CODE FOR STOPPING LOOK-AHEAD | MEANINGS |
|---|---|---|
| REMAINING AMOUNT OF MOVEMENT OF AXIS | M100 D5.0 | LOOK-AHEAD IS STOPPED AND LOOK-AHEAD IS RESTARTED WHEN REMAINING AMOUNT OF MOVEMENT OF AXIS IS 5 mm OR LESS |
| COORDINATE VALUE OF AXIS | M100 Z95.0 | LOOK-AHEAD IS STOPPED AND LOOK-AHEAD IS RESTARTED WHEN COORDINATE VALUE OF Z-AXIS IS 95 mm |
| AMOUNT OF DEVIATION OF SERVOMOTOR | M100 E2.0 | LOOK-AHEAD IS STOPPED AND LOOK-AHEAD IS RESTARTED WHEN AMOUNT OF DEVIATION OF Z-AXIS MOTOR IS 2 mm OR MORE |
| TORQUE OF SERVOMOTOR | M100 W1.0 | LOOK-AHEAD IS STOPPED AND LOOK-AHEAD IS RESTARTED WHEN TORQUE VALUE OF Z-AXIS MOTOR IS 1.0 N·m OR MORE |
| SIGNAL INPUT | M100 #1000 | LOOK-AHEAD IS STOPPED AND LOOK-AHEAD IS RESTARTED WHEN VALUE OF INTERFACE INPUT SIGNAL OF #1000 IS 1 |
| ... | ... | ... |

<PROGRAM EXAMPLE>

```
O0010
G00 Z0.0
G00 Z100.0          : MOVEMENT COMMAND (Z-AXIS)
M100Z5.0            : LOOK-AHEAD SUPPRESSION COMMAND
IF[#100EQ1] GOTO 100 : MACRO STATEMENT
G00 U10.0           : MOVEMENT COMMAND (X-AXIS)
...
N100
...
M30
```

<PROGRAM EXAMPLE>

```
O0020
G00 Z0.0
G00 Z100.0            : MOVEMENT COMMAND (Z-AXIS)
G04.1Z5.0             : LOOK-AHEAD SUPPRESSION COMMAND
IF[#100EQ1] GOTO 100  : MACRO STATEMENT
G00 U10.0             : MOVEMENT COMMAND (X-AXIS)
...
N100
...
M30
```

NUMERICAL CONTROLLER

BACKGROUND OF THE INVENTION

Field of the Invention

The present invention relates to a numerical controller, and more particularly, to a numerical controller with look-ahead of a machining program start function based on specified condition.

Description of the Related Art

Numerical controllers of some models are provided with a so-called look-ahead function such that blocks in a program are prefetched onto a memory of each numerical controller in a stage before the program is executed. While this look-ahead function has an advantage that it can minimize the influence of delayed analysis of the program on machining, it may result in various problems if there is any block that should not be analyzed until a machining operation based on its immediately preceding block is completed.

For example, a program O0001 shown in FIG. 7 includes a macro statement "IF[#100EQ1]GOTO 100" using a custom macro variable #100 that is 1 when a tool is located within a predetermined distance from a workpiece. This macro statement is described in the program with an intention to confirm the distance between the tool and the workpiece at the movement end point of the Z-axis. In running the program O0001 designed in this manner, if the macro statement "IF[#100EQ1]GOTO 100" is looked ahead before the Z-axis completes movement from 0.0 to 100.0 in response to a movement command "G00 Z100.0", the macro statement, unlike the axis movement command, is inevitably executed along with look-ahead/analysis processing. Thus, there is a problem that determination of the IF statement and jump (divergence) of the GOTO statement are inevitably made without succeeding in confirming the distance between the tool and the workpiece in a correct position. Conventionally, in order to avoid this problem, look-ahead is suppressed by using a look-ahead suppression command ("M100" in the program of FIG. 7) so that the macro statement can be read in after the movement of the Z-axis based on the movement command "G00 Z100.0" is completed. Moreover, in a prior art disclosed in Japanese Patent Application Laid-Open No. 2008-040542 or the like, restart of look-ahead after suppression of the look-ahead can be designated block by block.

On the other hand, a high-speed look-ahead suppression command is proposed in addition to a normal look-ahead suppression command (Japanese Patent No. 4271248). The high-speed look-ahead suppression command is designed so that the look-ahead suppression command can be executed at high speed by performing determination of a look-ahead stop code, suspension of look-ahead/analysis processing, and restart of the look-ahead/analysis processing after the termination of execution of the immediately preceding block.

According to the technique disclosed in Japanese Patent Application Laid-Open No. 2008-040542, however, the restart of look-ahead is designated block by block, so that there is a problem that the look-ahead restart cannot easily be controlled by specific values such as the axis position and spindle rotational speed. For example, there is no means for performing look-ahead for a macro statement when the Z-axis reaches any position, e.g., a position 1 mm short of the end point of a block, after issuance of a look-ahead suppression command in the program O0001 shown in FIG. 7, even if such performance is desired. This problem also occurs in the case of a high-speed look-ahead suppression command such as that disclosed in Japanese Patent No. 4271248.

SUMMARY OF THE INVENTION

Accordingly, the object of the present invention is to provide a numerical controller capable of finely designating a restart condition for look-ahead for a program after suppression of the look-ahead.

In the present invention, the above-described problems are solved by providing a numerical controller with a function of restarting look-ahead in the next and subsequent blocks in accordance with look-ahead restart conditions designated along with a look-ahead suppression command. Unlike the prior art case, the look-ahead restart conditions are not designated based on the number of blocks, but the remaining amount of movement and coordinate value of an axis, amount of deviation and torque of a servomotor, signal input related to a peripheral device, and the like are allowed to be designated so that the restart conditions can be commanded by a code that stops look-ahead.

A numerical controller according to the present embodiment is configured to sequentially read out and analyze commands for blocks of a program, perform look-ahead processing to save the result of the analysis in a buffer, and execute the commands for the blocks looked ahead based on the analysis result saved in the buffer, thereby controlling a machine, and is provided with a function of stopping the look-ahead processing when a block into which a code for stopping look-ahead is inserted is read out from the program. The numerical controller is characterized by being provided with a restart condition determination unit, configured to determine whether or not a look-ahead restart condition commanded by the code for stopping look-ahead is satisfied, and a look-ahead preceding restart unit, configured to restart the look-ahead processing if it is determined by the restart condition determination unit that the restart condition is satisfied, and in that the restart condition is a condition related to the state of the machine.

Moreover, the numerical controller is characterized in that the restart condition includes a remaining amount of movement of an axis of the machine, a coordinate value of the axis of the machine, an amount of deviation of a servomotor for driving the axis of the machine, a torque for driving the axis of the machine, and/or a signal input related to a peripheral device of the machine.

According to the present invention, the execution timing of a macro statement in the next and subsequent blocks of a look-ahead suppression command can be more highly controlled. Moreover, the cycle time can be reduced by advancing the timing of restart of look-ahead.

BRIEF DESCRIPTION OF THE DRAWINGS

The above and other objects and features of the present invention will, be obvious from the ensuing description of embodiments with reference to the accompanying drawings, in which:

FIG. 3 is a diagram showing examples of look-ahead restart conditions capable of being commanded by a code that stops look-ahead;

DETAILED DESCRIPTION OF THE PREFERRED EMBODIMENTS

Figure 1:
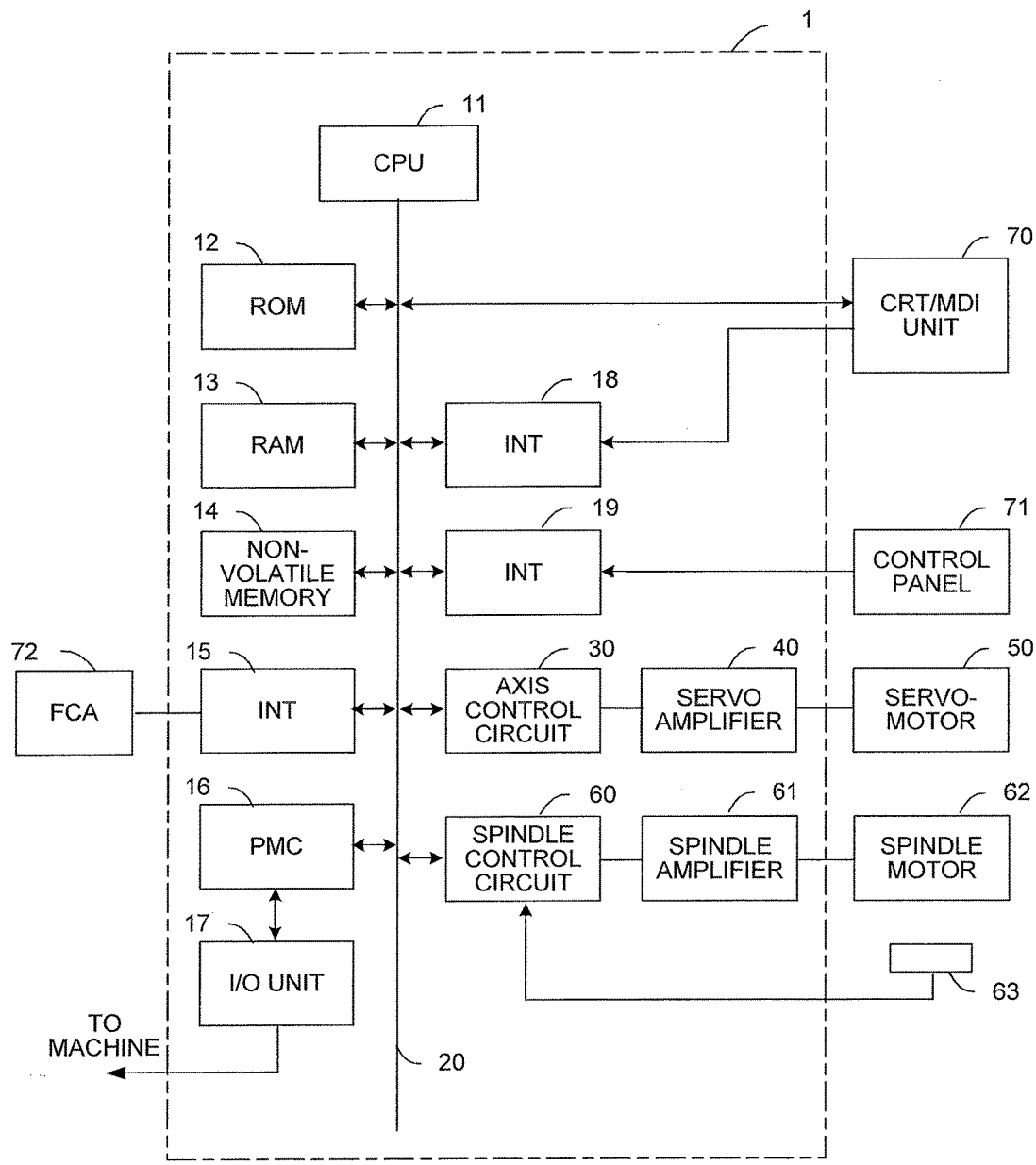
FIG. 1 is a hardware configuration diagram showing principal parts of a numerical controller according to one embodiment of the present invention.

FIG. 1 is a hardware configuration diagram showing principal parts of a numerical controller according to one embodiment of the present invention and a machine tool drivingly controlled by the numerical controller. A CPU 11 of a numerical controller 1 is a processor for generally controlling the numerical controller 1. The CPU 11 reads out a system program in a ROM 12 through a bus 20 and generally controls the numerical controller 1 according to this system program. A RAM 13 is loaded with temporary calculation data and display data, various data input by an operator through a CRT/MDI unit 70, and the like.

A non-volatile memory 14 is constructed as a memory that is, for example, backed up by a battery (not shown) so that its storage state can be maintained even when the numerical controller 1 is turned off. The non-volatile memory 14 is stored with a machining program (described later) read in through an interface 15 and a machining program input through the CRT/MDI unit 70. While the non-volatile memory 14 is further stored with programs for machining program operation processing used to run the machining programs, these stored programs are expanded in the RAM 13 at the time of execution. Moreover, various system programs for performing edit mode processing and the like needed to create and edit the machining programs are previously written in the ROM 12. The various machining programs including the machining programs for the execution of the present embodiment can be input through the interface 15 and the CRT/MDI unit 70 and loaded into the non-volatile memory 14.

The interface 15 is an interface for connecting the numerical controller 1 and external equipment 72 such as an adapter. The machining programs and various parameters are read in from the side of the external equipment 72. Moreover, the machining programs edited in the numerical controller 1 can be stored into an external storage means through the external equipment 72. A PMC (programmable machine controller) 16 controls peripheral devices (e.g., an actuator such as a robot hand for tool change) of the machine tool by outputting signals to them through an I/O unit 17 according to a sequential program stored in the numerical controller 1. Furthermore, on receiving signals from various switches on a control panel on the main body of the machine tool, the PMC 16 processes the signals as required and delivers them to the CPU 11.

The CRT/MDI unit 70 is a manual data input unit equipped with a display, keyboard and the like, and an interface 18 receives commands and data from the keyboard of the CRT/MDI unit 70 and delivers them to the CPU 11. An interface 19 is connected to a control panel 71 equipped with a manual pulse generator and the like.

An axis control circuit 30 for controlling axes of the machine tool receives a movement command amount of each axis from the CPU 11 and outputs a movement command for the axis to a servo amplifier 40. On receiving this command, the servo amplifier 40 drives a servomotor 50 for moving the axis of the machine tool. The servomotor 50 for the axis has a position/speed detector built-in, and a position/speed feedback signal from this position/speed detector is fed back to the axis control circuit 30 to perform position/speed feedback control.

In the hardware configuration diagram of FIG. 1, the axis control circuit 30, servo amplifier 40, and servomotor 50 are each shown as being only one in number. Actually, however, these elements are provided corresponding in number to the axes of the machine tool. Moreover, position/speed feedback from the servomotor 50 is not illustrated in FIG. 1.

A spindle control circuit 60 receives a spindle rotation command for the machine tool and outputs a spindle speed signal to a spindle amplifier 61. On receiving this spindle speed signal, the spindle amplifier 61 rotates a spindle motor 62 of the machine tool at a specified rotational speed, thereby driving a tool.

A position coder 63 is connected to the spindle motor 62 by means of gears, a belt or the like. The position coder 63 outputs feedback pulses in synchronism with the rotation of a spindle and the feedback pulses are read by the CPU 11.

Figure 2:
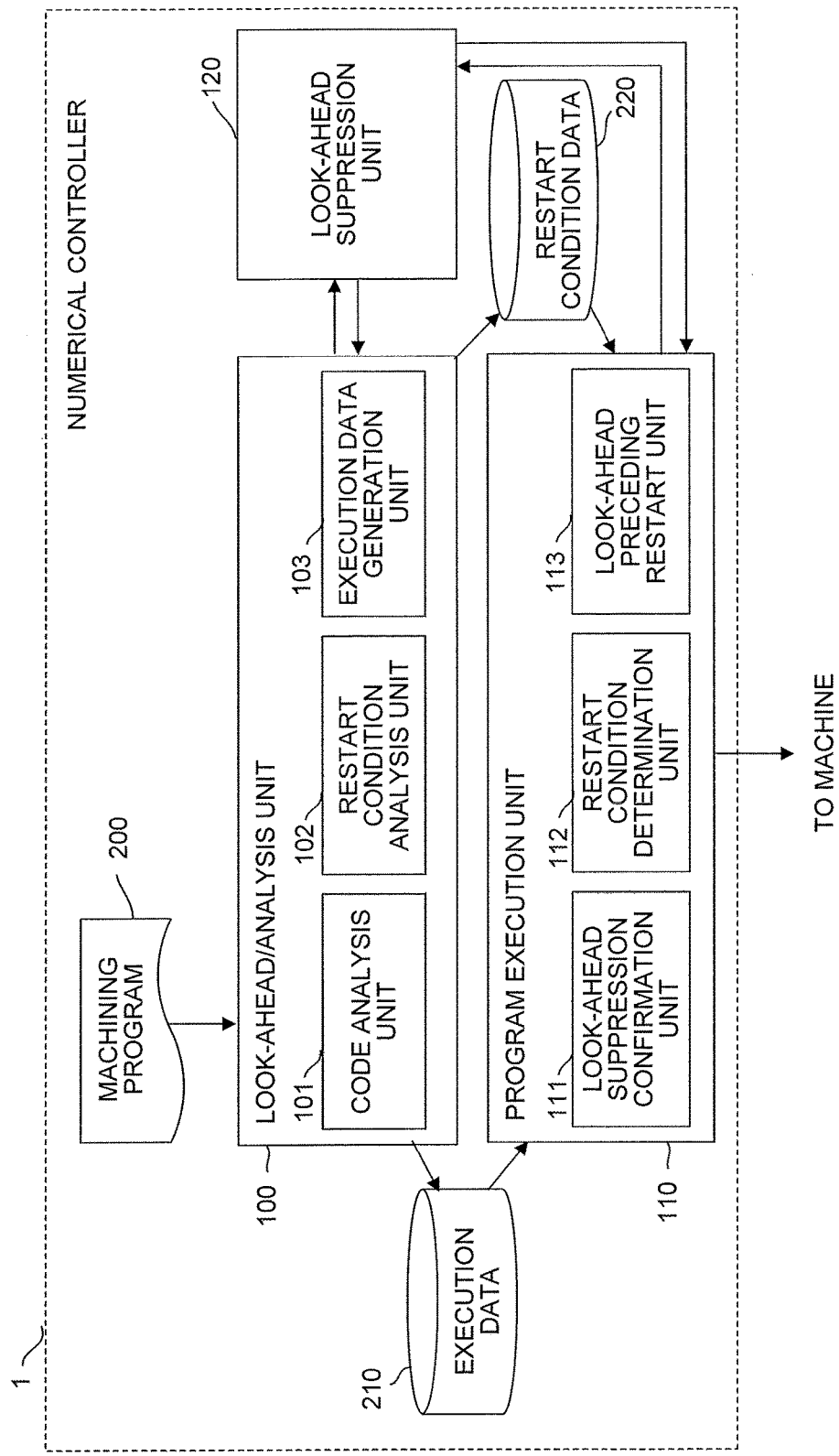
FIG. 2 is a schematic functional block diagram of the numerical controller according to the one embodiment of the present invention.

FIG. 2 shows a schematic functional block diagram according to the one embodiment in a case where an extended look-ahead function of the present invention is mounted as a system program in the numerical controller 1 shown in FIG. 1. Each of the function means shown in FIG. 2 can be obtained as the CPU 11 shown in FIG. 1 performs the system program to provide each function. The numerical controller 1 of the present embodiment comprises a look-ahead/analysis unit 100, program execution unit 110, and look-ahead suppression unit 120. Moreover, the look-ahead/analysis unit 100 comprises a code analysis unit 101, restart condition analysis unit 102, and execution data generation unit 103, while the program execution unit 110 comprises a look-ahead suppression confirmation unit 111, restart condition determination unit 112, and look-ahead preceding restart unit 113.

The look-ahead/analysis unit 100 sequentially looks ahead and analyzes blocks for commanding the operation of the machine tool to be controlled from a machining program 200 stored in the non-volatile memory 14 (not shown in FIG. 2). Then, the look-ahead/analysis unit 100 creates execution data corresponding to the contents of the blocks, based on the result of the analysis, and stores them into an execution data storage unit 210. The program execution unit 110 reads out the execution data from the execution data storage unit 210, and based on the execution data, executes actual, operation commands for the servomotor 50, spindle motor 62, and peripheral devices of the machine tool, thereby controlling the machine tool so as to operate in accordance with the machining program 200. Moreover, the program execution unit 110 deletes the executed execution data from the execution data storage unit 210.

The code analysis unit 101 analyzes codes contained in the blocks looked ahead from the machining program 200 and commands the execution data generation unit 103 to perform processing corresponding to the types of the individual codes. On receiving the command from the code analysis unit 101, the execution data generation unit 103 creates execution data corresponding to the codes analyzed by the code analysis unit 101.

If a code that stops look-ahead is included in the analyzed codes, on the other hand, the restart condition analysis unit 102 is commanded to process the block that contains the code concerned.

On receiving the command from the code analysis unit 101, the restart condition analysis unit 102 analyzes the code that stops look-ahead, and based on the result of the analysis, commands the look-ahead suppression unit 120 to start suppressing the look-ahead. Also, the restart condition analysis unit 102 creates restart condition data commanded by the code concerned and registers the data in a restart condition data storage unit 220. As shown in FIG. 3, for example, a look-ahead restart condition that can be commanded to the look-ahead stopping code can be described in a format for specifying the remaining amount of movement and coordinate value of the axis, amount of deviation and torque of the servomotor, and signal input value. These values are shown by way of example only, in FIG. 3, and may suitably be set within a design range such that any condition is allowed to be commanded as the restart condition, and the restart condition may be described in such a manner that a plurality of restart conditions can be registered or a logical expression can be described directly.

On the other hand, the look-ahead suppression confirmation unit 111 determines, based on the look-ahead suppression unit 120, restart condition data storage unit 220 and the like, whether or not look-ahead is stopped in the current processing cycle. If the look-ahead is stopped, the look-ahead suppression confirmation unit 111 commands the restart condition determination unit 112 to check the restart condition.

On receiving the command from the look-ahead suppression confirmation unit 111, the restart condition determination unit 112 refers to the restart condition data registered in the restart condition data storage unit 220, obtains values (remaining amount of movement and coordinate value of the axis, etc.) to be determined by the restart condition data from various parts of the numerical controller 1, and determines whether or not the obtained values satisfy the restart condition set by the restart condition data. If the obtained values satisfy the restart condition set by the restart condition data, the look-ahead preceding restart unit 113 is commanded to perform look-ahead restart processing. If a plurality of restart conditions are registered in the restart condition data storage unit 220, the restart condition determination unit 112 may be configured to perform determination on the restart conditions set by the individual restart condition data and command the look-ahead preceding restart unit 113 to perform the look-ahead restart processing only when all the restart conditions are satisfied.

On receiving the command from the restart condition determination unit 112, the look-ahead preceding restart unit 113 commands the look-ahead suppression unit 120 to stop the suppression of look-ahead (or to restart look-ahead) and deletes the restart condition data stored in the restart condition data storage unit 220.

The following is a description of an operation example in a case where a grinder is controlled by the numerical controller 1 described with reference to FIG. 2.

In dressing a grindstone, the grinder operates in the following order.

Operation 1: The Z-axis is moved in a negative or positive direction.

Operation 2: A touch sensor is checked at the end point of the Z-axis.

Operation 3-1: If the contact between the grindstone and a dresser is not detected by the touch sensor, the X-axis is moved to bring the grindstone and the dresser close to each other, whereupon the operation returns to Operation 1.

Operation 3-2: If the contact between the grindstone and the dresser is detected by the touch sensor, the movement is stopped there for a certain period of time for dressing, whereupon the operation returns to Operation 1.

Although position arrival check by the touch sensor cannot be achieved due to the possibility of false detection during the movement of the Z-axis, the detection is assumed to be correct when the Z-axis comes almost within an in-position width of the end point. In the case of this operation example, since the touch sensor is checked by a macro statement in Operation 2, a look-ahead suppression command (G53P1, G04.1 or the like) are required between the movement of the Z-axis and the macro statement. If the look-ahead suppression command is issued, however, the macro statement cannot be executed until the Z-axis stops. If the touch sensor can then be checked when the Z-axis somewhat approaches the end point, those blocks (X-axis movement commands) at the time of and after the touch sensor check can be looked ahead, so that the cycle time can be reduced.

Figure 4:
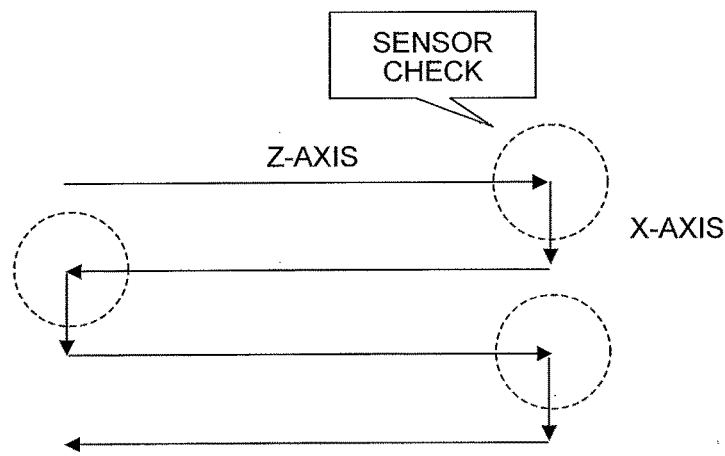
FIG. 4 is a diagram showing an example of a machining program used in the numerical controller of FIG. 2.

FIG. 4 is a diagram showing a program example in this operation example. If the grinder is controlled by the numerical controller 1 shown in FIG. 2 using a program O0010 shown in FIG. 4, the look-ahead can be stopped and restarted in the following schematic processing procedures.

Procedure A1: The look-ahead/analysis unit 100 looks ahead a block M100Z5.0 from the program.

Procedure A2: The code analysis unit 101 analyzes the block M100Z5.0 and determines that this block contains a code (M100) that stops the look-ahead.

Procedure A3: The restart condition analysis unit 102 extracts a restart condition Z5.0 (for restart with a remaining amount of movement of 5.0 mm) from the block M100Z5.0, creates restart condition data based on the extracted condition, and registers the data in the restart condition data storage unit 220.

Procedure A4: The look-ahead suppression unit 120 suppresses look-ahead thereafter.

Procedure A5: The program execution unit 110 starts execution processing based on execution data of a block G00Z100.0 stored in the execution data storage unit 210.

Procedure A6: The look-ahead suppression confirmation unit 111 confirms that look-ahead is suppressed based on the look-ahead suppression unit 120 and the restart condition data storage unit 220.

Procedure A7: If the look-ahead is suppressed, the restart condition determination unit 112 determines whether or not the restart condition is satisfied by the Z-axis. If the restart condition is satisfied by the Z-axis (or if the remaining amount of movement of the Z-axis is not more than 5.0 mm), the restart condition determination unit 112 commands the look-ahead preceding restart unit 113 to perform the look-ahead restart processing.

Procedure A8: The look-ahead preceding restart unit 113 commands the look-ahead suppression unit 120 to stop the suppression of look-ahead.

Procedure A9: The look-ahead suppression unit 120 stops the suppression of look-ahead. Thereupon, the look-ahead/analysis unit 100 restarts program look-ahead.

As these procedures are performed, the touch sensor can be checked before the movement of the Z-axis is completed. Thus, by using the numerical controller with the above-described configuration, an operation to "check the touch sensor (or execute the macro statement) in the vicinity of the end point of the Z-axis" can be achieved, so that the cycle time can be reduced as compared with the case where a prior art is used.

Figure 5:
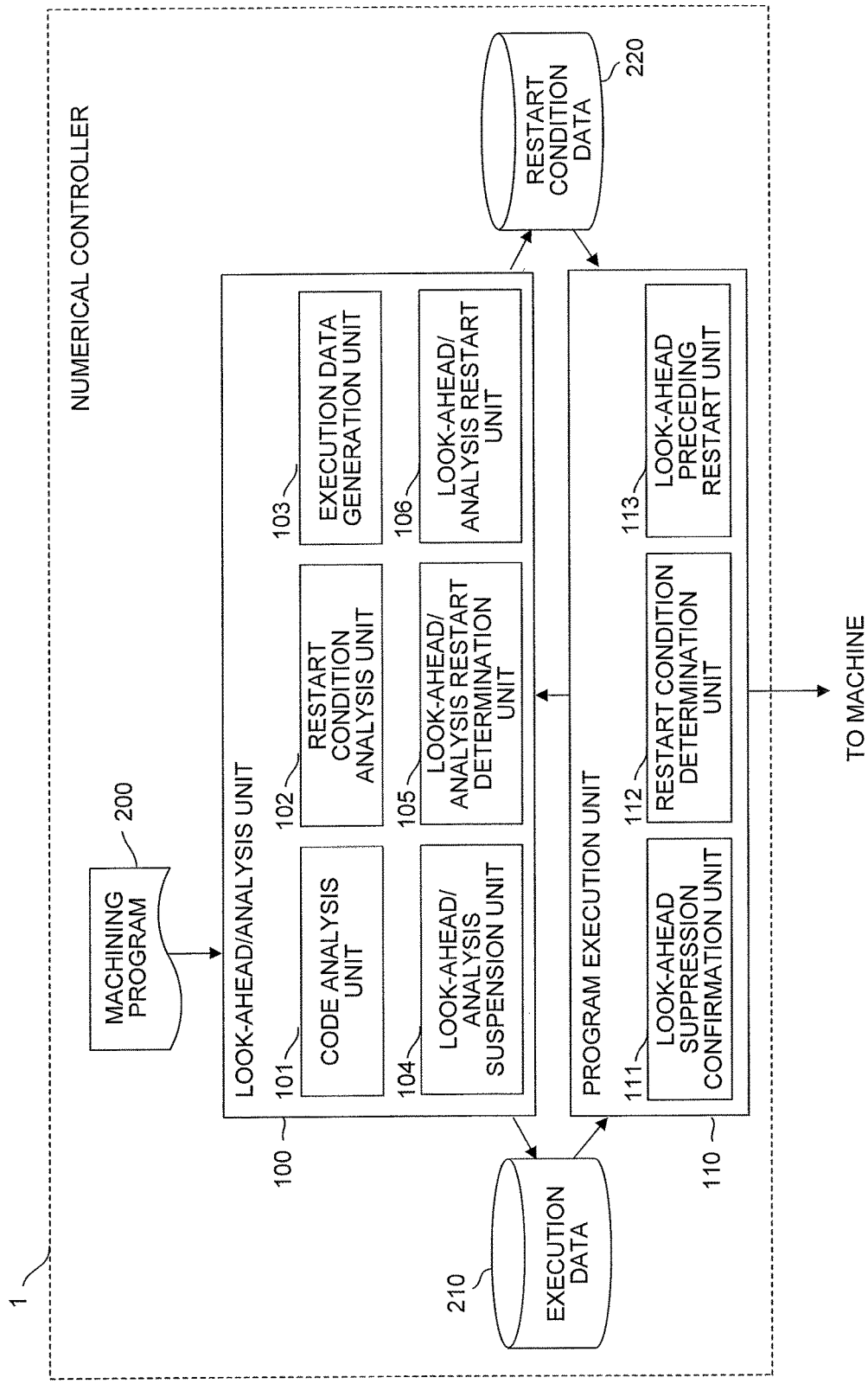
FIG. 5 is a schematic functional block diagram of a numerical controller according to another embodiment of the present invention.

FIG. 5 shows a schematic functional block diagram according to another embodiment in the case where the extended look-ahead function of the present invention is mounted as the system program in the numerical controller 1 shown in FIG. 1. The numerical controller 1 shown in FIG. 5 is a numerical controller corresponding to a high-speed look-ahead suppression command (e.g., G04.1) and comprises a look-ahead/analysis suspension unit 104, look-ahead/analysis restart determination unit 105, and look-ahead/analysis restart unit 106, in addition to the individual function means of the numerical controller described with reference to FIG. 2.

A look-ahead/analysis unit 100, code analysis unit 101, and execution data generation unit 103 of the present embodiment are generally operated in the same manner as those of the numerical controller described with reference to FIG. 2.

On receiving the command from the code analysis unit 101, the restart condition analysis unit 102 analyzes the code that stops look-ahead, and based on the result of the analysis, commands the look-ahead/analysis suspension unit 104 to start suppressing the look-ahead. Also, the restart condition analysis unit 102 creates restart condition data commanded by the code concerned and registers the data in a restart condition data storage unit 220.

On receiving the command from the restart condition analysis unit 102, the look-ahead/analysis suspension unit 104 suspends look-ahead from a machining program 200.

The look-ahead/analysis restart determination unit 105 determines whether or not the look-ahead may be restarted based on the command from the look-ahead preceding restart unit 113.

The look-ahead/analysis restart unit 106 restarts the look-ahead from the machining program 200 based on the result of the determination by the look-ahead/analysis restart determination unit 105.

On the other hand, a program execution unit 110, look-ahead suppression confirmation unit 111, and restart condition determination unit 112 of the present embodiment are generally operated in the same manner as those of the numerical controller described with reference to FIG. 2.

On receiving the command from the restart condition determination unit 112, a look-ahead preceding restart unit 113 of the present embodiment notifies the look-ahead/analysis restart determination unit 105 of the possibility of restart of look-ahead and deletes the restart condition data stored in the restart condition data storage unit 220.

The following is a description of an operation example in a case where a grinder is controlled by the numerical controller 1 described with reference to FIG. 5.

Figure 6:
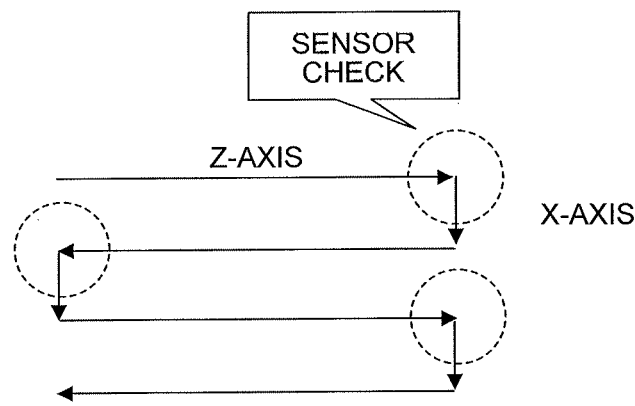
FIG. 6 is a diagram showing an example of a machining program used in the numerical controller of FIG. 5.
Figure 7:
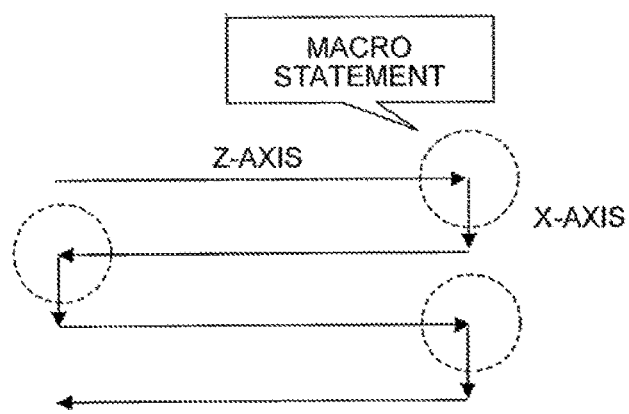
FIG. 7 is a diagram showing an example of a machining program in which a prior art look-ahead suppression command is described.

FIG. 6 is a diagram showing a program example in this operation example. If the grinder is controlled by the numerical controller 1 shown in FIG. 5 using a program O0020 shown in FIG. 6, the look-ahead can be stopped and restarted in the following schematic processing procedures.

Procedure B1: The look-ahead/analysis unit 100 looks ahead a block G04.1Z5.0 from the program.

Procedure B2: The code analysis unit 101 analyzes the block G04.1Z5.0 and determines that this block contains a code (G04.1) that stops the look-ahead.

Procedure B3: The restart condition analysis unit 102 extracts a restart condition Z5.0 (for restart with a remaining amount of movement of 5.0 mm) from the block G04.1Z5.0, creates restart condition data based on the extracted condition, and registers the data in the restart condition data storage unit 220.

Procedure B4: The look-ahead/analysis suspension unit 104 suspends look-ahead thereafter.

Procedure B5: The program execution unit 110 starts execution processing based on execution data of a block G00Z100.0 stored in the execution data storage unit 210.

Procedure B6: The look-ahead suppression confirmation unit 111 confirms that look-ahead is suppressed based on the restart condition data storage unit 220 and the like.

Procedure B7: If the look-ahead is suppressed, the restart condition determination unit 112 determines whether or not the restart condition is satisfied by the Z-axis. If the restart condition is satisfied by the Z-axis (or if the remaining amount of movement of the Z-axis is not more than 5.0 mm), the restart condition determination unit 112 commands the look-ahead preceding restart unit 113 to perform look-ahead restart processing.

Procedure B8: The look-ahead preceding restart unit 113 notifies the look-ahead/analysis restart determination unit 105 of the possibility of restart of look-ahead.

Procedure B9: The look-ahead/analysis restart determination unit 105 determines that the look-ahead can be restarted and commands the look-ahead/analysis restart unit 106 to restart the look-ahead.

Procedure B10: The look-ahead/analysis restart unit 106 performs the look-ahead restart processing. Thereupon, the look-ahead/analysis unit 100 restarts program look-ahead.

As these procedures are performed, the touch sensor can be checked before the movement of the Z-axis is completed. Thus, by using the numerical controller with the above-described configuration, also in the case where the high-speed look-ahead suppression command (e.g., G04.1) is executed, an operation to "check the touch sensor (or execute the macro statement) in the vicinity of the end point of the Z-axis" can be achieved, so that the cycle time can be reduced as compared with the case where a prior art is used.

While embodiments have been described herein, the invention is not limited to the above-described embodiments and may be suitably modified and embodied in various forms.

The invention claimed is:
1. A numerical controller comprising:
a processor configured to;
sequentially read out and analyze commands for a sequence of blocks of a program, the sequence including a first block immediately preceding a second block;
perform look-ahead processing to analyze the second block before the first block is complete, and to save the result of the analysis in a buffer;
control a machine by executing the commands for the first block;
execute a function of stopping the look-ahead processing when the second block includes a code for stopping the look-ahead processing;
determine whether or not a look-ahead restart condition commanded by the code for stopping look-ahead is satisfied; and
restart the look-ahead processing of the second block prior to the first block being completed, if it is determined that the look-ahead restart condition is satisfied,
wherein the look-ahead restart condition is a condition related to the state of the machine.

2. The numerical controller according to claim 1, wherein the look-ahead restart condition includes a remaining amount of movement of an axis of the machine, a coordinate value of the axis of the machine, an amount of deviation of a servomotor for driving the axis of the machine, a torque for driving the axis of the machine, and/or a signal input related to a peripheral device of the machine.

* * * * *